US008909540B1

(12) United States Patent
Greenbaum

(10) Patent No.: US 8,909,540 B1
(45) Date of Patent: Dec. 9, 2014

(54) METHODS AND SYSTEMS FOR PROVIDING AND MAINTAINING RETIREMENT INCOME

(76) Inventor: Marshall C. Greenbaum, Greenwich, CT (US)

( * ) Notice: Subject to any disclaimer, the term of this patent is extended or adjusted under 35 U.S.C. 154(b) by 257 days.

(21) Appl. No.: 12/967,920

(22) Filed: Dec. 14, 2010

Related U.S. Application Data

(63) Continuation of application No. 12/942,952, filed on Nov. 9, 2010, now abandoned.

(60) Provisional application No. 61/259,350, filed on Nov. 9, 2009.

(51) Int. Cl.
*G06Q 40/00* (2012.01)
(52) U.S. Cl.
USPC .................................. 705/4; 705/35
(58) Field of Classification Search
USPC ........................................... 705/4, 35
See application file for complete search history.

(56) References Cited

U.S. PATENT DOCUMENTS

| 5,913,198 | A | * | 6/1999 | Banks | 705/36 R |
| 7,457,774 | B1 | | 11/2008 | Bridges et al. | |
| 2005/0187851 | A1 | * | 8/2005 | Sant | 705/36 |
| 2006/0015425 | A1 | * | 1/2006 | Brooks | 705/35 |
| 2006/0059077 | A1 | * | 3/2006 | Goodman et al. | 705/37 |

* cited by examiner

*Primary Examiner* — William Rankins
(74) *Attorney, Agent, or Firm* — Stroock & Stroock & Lavan LLP

(57) ABSTRACT

Methods and systems for the provision of a targeted risk-protected minimum income benefit or protected distribution through the design and management of a trust that allows for exposure to the equity and fixed-income markets. The targeted minimum income amounts depend upon the performance of equity and fixed income assets and risk mitigation instruments contained in the Trust. The method and system rely upon the adjustment of constituent assets to provide for the targeted minimum retirement income amounts. The action of risk management procedures eliminate reliance upon third-party guarantors. The methods and systems include mortality management procedures that protect the participants against longevity risk.

14 Claims, 4 Drawing Sheets

Updated periodically, e.g. daily
Data Collection

Valuation Module

Computational Module

Assets dynamically adjusted to match fair value risk sensitivities of the Income Protection Account Claims within tolerances

FIGURE 4

Actuarial Assumptions

Mortality: 90% of the Annuity 2000 Basic Mortality Table
Gender: Assumes 50% Male/50% Female Population

Simplified Capital Market Assumptions

Balanced Fund Volatility: 17.00% annualized
Interest Rates: 4.00%

| | Time (in Days) | Before Rebalancing Day 1 | After Rebalancing Day 1 | |
|---|---|---|---|---|
| | 0 | | | |
| Participant Data | | | | |
| Age | 60 | 60.0027 | 60.0027 | |
| Years Remaining to Distributions | 5 | 4.9973 | 4.9973 | |
| Highest Anniversary BFA Value | $ 80,000 | $ 80,000 | $ 80,000 | |
| Current PADA | $ 4,400 | $ 4,395 | $ 4,395 | PADA adjusted to reset IPA Claims Fair Value = IPA Value |
| Total Trust Fees | 0.85% | 0.85% | 0.85% | |
| BFA | | | | |
| Balanced Fund ETF | $ 80,000 | $ 76,000 | $ 76,000 | Reflects 5% Drop in Value |
| IPA | | | | Set IPA Delta = IPA Claims Delta with respect to Balanced Fund ETF |
| Balanced Fund ETF | $ 13,000 | $ 12,350 | $ 10,000 | Sold $2,350 of Balanced Fund ETF |
| Money Market Fund | $ 7,000 | $ 7,000 | $ 9,350 | Purchased $2,350 Money Market Fund |
| IPA Value | $ 20,000 | $ 19,350 | $ 19,350 | |
| Total Trust Value (BFA + IPA) | $100,000 | $ 95,350 | $ 95,350 | |
| Valuation Module Calculations | | | | |
| IPA Claims Fair Value | $ 20,000 | $ 19,350 | $ 19,350 | |
| IPA Claims Delta wrt Balanced Fund ETF | $ 13,000 | | $ 10,000 | |

Notes:

The initial delta is positive which may seem counterintuitive for the protection of the PADA (ie a put option).
However, the PADA contains the highest anniversary value feature which results in an initial positive delta with respect to the BFA.
Money Market Fund Assumes 0% Interest for simplicity.

METHODS AND SYSTEMS FOR PROVIDING AND MAINTAINING RETIREMENT INCOME

CROSS-REFERENCE TO RELATED APPLICATIONS

This application is a continuation of U.S. application Ser. No. 12/942,952, entitled "Methods and Systems For Providing and Maintaining Retirement Income," filed Nov. 9, 2010, now abandoned which claims the benefit of U.S. Provisional Application Ser. No. 61/259,350, entitled "Methods and Systems For Providing and Maintaining Retirement Income," filed Nov. 9, 2009, the entire disclosure of each of which is expressly incorporated by reference herein.

BACKGROUND OF THE INVENTION

1. Fields of the Invention

The present invention relates to methods and systems for the provision and maintenance of risk-protected retirement income using self-funding risk-control techniques.

2. Description of Related Art

Defined-benefit pension plans involve the delivery of recurrent retirement income to participants according to formulas contained in the governing plan documents. Income amounts are typically based on years of employment service and the participants' compensation in years prior to retirement. The plan sponsor operating a defined-benefit plan assumes a variety of risks involved with assuring that promised retirement income payments can actually be made. These risks may include those related to funding sufficiency, uncertain investment returns of plan assets, and realized participant mortality experience vs. mortality rate assumptions. While stringent regulations apply to the operation of a defined-benefit plan, many companies have found the risks and costs associated with such plans to be burdensome, making them less common today.

A defined-contribution pension plan, such as that enabled by §401(k) of United States Internal Revenue Code, involves the recurrent contribution of deposits into investment funds that grow until retirement, when withdrawals are contemplated. While the plan sponsor may also contribute to the fund, no specified retirement income amounts are promised. Plan participants therefore bear the funding, investment and longevity risk (chance of outliving one's assets) involved with such a defined-contribution plan. The performance of defined-contribution plans has been unsteady due to market volatility, causing particular difficulty for participants near or in their early retirement years.

A number of attempts have been made to remediate the risks that a defined-contribution plan participant bears. One attempt involves the participant's purchase with plan proceeds of an insurance company annuity contract that promises fixed payments over the participant's lifetime. However, annuity contracts significantly restrict participant access to funds, reduce assets available to beneficiaries and may not provide retirement income of a sufficient amount. Another attempted solution involves the introduction of guarantees in the form of guaranteed minimum withdrawal and income benefits that provide for lifetime income. A common guaranteed minimum withdrawal benefit (GMWB) allows the fund holder starting at a certain age to withdraw a fixed percentage (typically around 5%) of a guaranteed income base every year (the guaranteed income amount). A common guaranteed income base is a fixed percentage of the highest anniversary value of a balanced or target-date retirement fund held inside the participant's account. If fund assets become depleted after first taking withdrawals from the fund, the insurer promises to make the fixed payments for the remainder of the participant's lifetime. This benefit is provided to the participants in the faint of an insurance (annuity) contract. These contracts provided by insurance companies subject participants to the claim-payment abilities of the insurance company, a third party guarantor. The ability of guarantors to stand behind such guarantees over the full life expectancies of participants is unknown and plan fiduciaries are reluctant to subject all or a significant portion of their plan participants to the claim-payment risk of one or more third party guarantors.

FIG. 1 is a schematic illustrating aspects of prior art, most notably the use of third-party guarantors to provide guarantees for retirement income amounts. As shown, Retirement Plan Participants contribute to a fund that is invested in assets that provide for the return of Contributions along with Investment Returns. The fund pays an Annual Guarantee Fee to the Insurer or Third-Party Guarantor. (The Guarantor in turn may hedge its guarantee liability through transactions with Derivatives Dealers.) If the Fund's assets are insufficient to meet the guaranteed retirement income amount, the Guarantor makes the required payments after the Fund's assets are depleted.

Thus, there is a need in the art for a method and system for the creation and/or maintenance of an improved retirement income plan.

BRIEF SUMMARY OF THE INVENTION

Embodiments of the present invention satisfy this and other needs. In general, embodiments of the present invention overcome problems and limitations of the prior art by providing a method and system for the allocation, management and disposition of assets held in a participant's retirement account, such as a defined contribution plan, that result in the ultimate production of retirement income in predictable and sufficient amounts. These retirement income amounts constitute significant participant protection from the risks of funding sufficiency, investment performance and participant longevity. As will be appreciated by those skilled in the art, embodiments of the invention result in an improved retirement savings system that more safely delivers income of sufficient amount that participants cannot outlive. Reducing costs and controlling the risks associated with offering retirement plans act to benefit both the participants and plan sponsors, offering peace-of-mind to potentially millions of current and future retirees.

In certain embodiments, the methods and systems for the development and maintenance of a protected retirement income amounts through the management of a Trust of retirement assets include various combinations of the following features:

(1) the design and management of a protected minimum withdrawal, distribution or income benefit; the benefit constitutes significant participant protection against the risks of funding sufficiency, investment performance and longevity risk;

(2) investment management algorithms for the acquisition, allocation and disposition of Trust assets that contribute to the attainment of the protected minimum retirement withdrawal, distribution or income amounts contemplated by the benefit;

(3) risk management procedures for the acquisition, allocation and disposal of risk mitigation instruments that contribute to the attainment of the protected minimum retirement withdrawal, distribution or income amounts contemplated by the benefit and that eliminate reliance upon the undependable performance of third-party guarantors;

(4) mortality management procedures that protect against asset depletion over the natural lifetime, or other period, of the participant and thereby constitute significant protection against longevity risk;

(5) significant sustained exposure to equity and fixed income markets and the long-term returns that may be expected from them;

(6) a minimum retirement withdrawal, distribution or income benefit that may increase over time based on the investment and risk management performance of the Investment Advisors;

(7) design variation flexibility that enables embodiments of the invention to be distributed via various retail or wholesale channels, in various end-consumer packaging, and under various arrangements of fees, commissions and charges;

(8) a data collection software module for operating on one or more processors, including an actuarial component, for compiling relevant data;

(9) a valuation software module for operating on one or more processors, including an economic scenario generator, to calculate fair values and hedge ratios;

(11) a computational software module for operating on one or more processors, including management algorithms, to calculate dynamic asset rebalancing adjustments to the Trust; and

(12) a distributed computing environment to facilitate the valuation module for frequent trading decisions.

BRIEF DESCRIPTION OF THE DRAWINGS

The foregoing summary, as well as the following detailed description of certain embodiments, will be better understood when read in conjunction with the appended drawings. For the purposes of illustrating the method and system, certain illustrative embodiments are shown in the drawings. It should be understood, however, that the invention is not limited to the precise arrangements and instrumentalities shown. In the drawings:

FIG. 4 is a spreadsheet illustrating an illustrative scenario of rebalancing Trust assets for a one day hypothetical market move for one simplified embodiment of the present invention using a simple delta only hedging rebalancing approach.

DETAILED DESCRIPTION OF CERTAIN EMBODIMENTS

Figure 1:
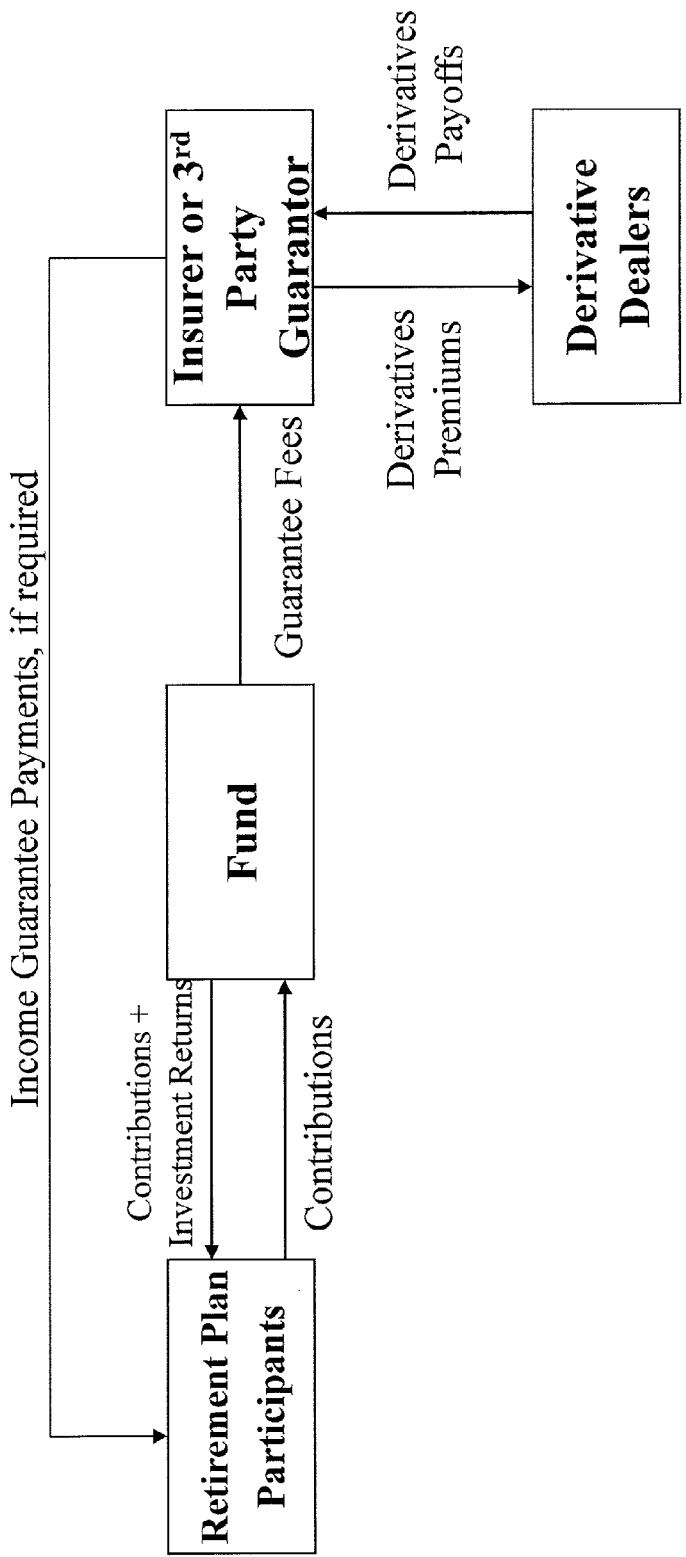
FIG. 1 is a schematic illustrating a prior art example providing a lifetime retirement income benefit within a defined contribution plan offered by insurance companies through a standalone Guaranteed Minimum Withdrawal Benefit contract.

In one embodiment of the invention, a fund or collective investment trust (both generically referred to as the "Trust") is established for holding retirement assets of multiple participants. The Trust has an explicitly stated investment objective to provide 1) exposure to equity and fixed income investments (the "Balanced Fund Assets" as further defined below) while 2) protecting for a minimum annual (or other) distribution amount (the "Protected Annual Distribution Amount" or "PADA") to be distributed from the Trust for the participant's lifetime during a distribution phase which starts after an accumulation phase, e.g. 20 years. The Trust may group individuals with similar ages and years until retirement, e.g. age 45 with 20 years until retirement such that the Trust would maintain a net asset value (NAV) and participants would own units of the Trust similar to a mutual fund. The PADA can be defined in any of a number of different ways, including, by way of example, some percentage (e.g., 5%) of the greater of deposits or the highest prospective anniversary value achieved by the Balanced Fund Assets, as adjusted for deposits and withdrawals. Since the PADA in this embodiment is a function of the highest anniversary value of the Balanced Fund Assets, the PADA can only increase over time, allowing for sustained exposure to positive market performance. Note, the PADAs are payments from the Trust that could exceed the actual income earned on the assets held in the Trust. It should be understood that the PADA is a management objective stipulated in the Trust and the targeted PADA may need to be adjusted over time as it is subject to the payment ability of the Trust, not a third-party guarantor. However, the self-funding risk control techniques employed as part of the embodiment should achieve the initially established objective with a high degree of probability.

The self-funding techniques of pooling and combining the market exposure, the risk protection and longevity risks directly in the Trust for a group of individuals allow for the production of a lifetime income benefit at significantly reduced cost compared to prior art. Since the risk protection provided is not guaranteed by a third party, the high costs associated with the risk margins and capital requirements are eliminated. In addition, since the participants own all of the risk mitigation instruments in the Trust there is significantly improved liquidity and access to funds compared to an insurer GMWB offering. Under an insurer GMWB, fees are typically charged for the guarantee as an annual percentage of the fund value. The policyholder has no access to the value of the guarantee (which can be very large when the market is down) and must hold the contract to maturity to receive the benefit of the guarantee.

In the present embodiment, the majority of the Trust deposits are invested in a "Balanced Fund Account (BFA)," which is composed of a diversified allocation of fixed-income and equity-market investments or financial instruments providing exposure to fixed-income and equity-market investments that would periodically be rebalanced to a defined percentage allocation between equity and fixed income investments (the "Balanced Fund Assets"), and the remainder is invested in an "Income Protection Account (IPA)," which is composed of risk mitigation instruments (the "Income Protection Assets"), together constituting the "Participant Accounts". In general, the BFA may be managed with more of a "buy and hold" strategy as compared to the IPA. The portion of deposits allocated to the IPA is determined to appropriately provide for the PADA payments stated in the Trust investment objective based on actuarial assumptions and relevant capital market variables at the time of deposit. Participants own the Participant Accounts (i.e., BFA and IPA) and all assets may be market-valued for participant reporting. The IPA acts as a risk buffer protecting the ability of the Trust to pay the PADA over the participant's lifetime. The Income Protection Assets may include listed exchange-traded and/or over-the-counter (OTC), mainly liquid, mainly cash-settled risk mitigation instruments of various kinds, including for example, S&P 500 Index put and call options of various maturities and strike levels. These instruments may be actively managed by an investment advisor on a dynamic basis reflecting Balanced Fund Asset performance and the changes in the relevant capital market variables. The investment management would adhere to explicit management objectives and instructions contained in governing Trust documents. These investment objectives articulate key risk sensitivities (e.g., changes in fair value with respect to changes in capital market variables) to be maintained within certain degrees of tolerance for the IPA.

The Investment Advisor will manage both the Balanced Fund Account and the Income Protection Account collectively. This would enable improved cost efficiency since the two accounts could recognize internal offsetting effects. For example, the Balance Fund Account could have a long position in certain equity instruments, say an S&P 500 Index exchange traded fund (ETF). The IPA, when the market is down, might need to enter into a short position in the same ETF to properly protect for the PADA. Instead of simultaneously being long the ETF in the BFA and short the ETF in the IPA, it could simply hold the net position in the BFA. The BFA would be tracked and accounted for as if it held the full long ETF position.

Managing both the Balanced Fund Account and the Income Protection Account together may also allow the investment advisor to better protect the Trust investment objective for a Balanced Fund Account that includes actively managed mutual funds since shorting mutual funds is not permissible. This cost efficiency is unavailable in the prior art since the derivative instruments utilized by an insurer (or third party guarantor) would need to short market index instruments most similar to the actively managed fund. The Trust, under the present invention, could simply hold a net position of the actively managed mutual fund in the Balanced Fund Account, thereby avoiding significant basis risk.

The Income Protection Assets protect a retirement income amount (the PADA) that depends upon the amount and type of assets invested in the Balanced Fund Account. The PADA may be defined in any of a number of different ways, including, by way of example, some percentage (e.g., 5%) of the greater of deposits or the highest prospective anniversary value achieved by the participant's Balanced Fund Account, as adjusted for deposits and withdrawals. This PADA would initially be paid to surviving participants from the Balanced Fund Account (e.g., annually) after an accumulation period, for example, of 20 years or in alternate embodiments when the participant reaches a certain age. If the Balanced Fund Account becomes depleted after paying out the PADA, the future PADAs may then be claims payable and funded by the IPA (the "Income Protection Account Claims"). The IPA Claims can be viewed as a liability of the Trust with an associated fair value. It will be understood by those skilled in the field that the IPA Claims can be fair valued as a financial "put option" using derivative and actuarial pricing techniques. The initial allocation to the IPA would be set equal to the fair value of the IPA Claims. When the fair value appropriately reflects the risks associated with the IPA Claims, the same amount established in the IPA will be able to self-fund the IPA Claims with a high degree of probability when managed properly. The investment advisor manages the ability of the IPA to pay the IPA Claims by actively adjusting the holdings of the risk mitigation instruments in the IPA. By measuring and aligning the directionalities and magnitudes of key risk sensitivities of the Income Protection Assets with corresponding key risk sensitivities of potential IPA Claims, the IPA protects for the payment of the PADA for the remainder of the participant's lifetime. For example, one key risk sensitivity to be maintained within a certain range of tolerance is the delta sensitivity (change in fair value with respect to market value changes of the Balanced Fund Assets) of the Income Protection Assets with the delta sensitivity of the IPA Claims. Similar fair value sensitivities with respect to interest rates, equity-market volatilities and other variables could be maintained.

The PADA may be adjusted (e.g., periodically) based on actual-versus-expected mortality of the participants as a collective group during the distribution phase. For example, if participant mortality is greater than the assumed mortality rates used in the calculation of the IPA Claim fair value, then the PADA would be adjusted upward on a proportional basis and vice versa to appropriately reset the IPA Claims fair value to be equal to the current value of the IPA. It may also be adjusted (e.g., periodically) based on the actual management performance of the IPA. For example, if following Trust inception the market value of the Income Protection Assets exceeds the fair value of the potential IPA Claims by a defined margin, the targeted PADA will be adjusted upward and vice versa to appropriately reset the IPA Claims fair value to be equal to the current value of the IPA. FIG. 4 includes a simplified example of adjusting the target PADA to reflect the management experience of the IPA. The adjustments to the PADA allow the participants to gauge how effectively the IPA is protecting for the PADA before the actual PADA payments are made. This transparency is unavailable in the prior art as participants must hold the contract under an insurer offered GMWB to determine whether they will actually be paid their withdrawal benefit if their funds become exhausted.

Also in the present embodiment, participants (and their beneficiaries) maintain a market-value ownership of all Trust assets during the accumulation period. In one embodiment, participants (and their beneficiaries) always maintain withdrawal rights to the Balanced Fund Account after the accumulation period but forfeit the value of the IPA upon death or withdrawal of the Balanced Fund Account. The forfeiture of the IPA upon death is designed to support remaining participants. The forfeiture upon withdrawals is designed to prevent anti-selective withdrawals if Participants have a changed view on their longevity perhaps due to an illness which would then be disadvantageous to the remaining Participants. The portion of deposits allocated to the IPA during the accumulation phase would be set to equal the IPA Claims fair value that would incorporate projected mortality rates of the group during the distribution phase. The calculation of the IPA Claims fair value assumes a certain amount of forfeited IPA balances based on the projected mortality rates. The forfeited amounts are utilized to protect remaining participants' lifetime payments. The longevity protection effectuated in this fashion is self-funding and economically efficient.

In certain embodiments, a pro-rata forfeiture of the IPA may occur in the event of partial withdrawals of the Balanced Fund Account only for withdrawals that are in excess of an allowable amount of withdrawals.

In certain embodiments, several Trusts could be established for a retirement plan sponsor program. Each individual trust would correspond to a particular age range or years of birth. For example, a separate trust may be for individuals born in 1970-1974, 1975-1979, 1980-1984, and the like, with the management objectives for each trust being different to reflect remaining years to retirement and age of participants. New Trusts might also be established at future intervals to reflect current capital market conditions resulting in differing initial target PADAs. For example, if interest rates rise and other capital market variables remained the same, higher target PADAs could be established as the new Trust's investment objective.

In certain embodiments, one Trust could be established with calculations of BFA and IPA values held by the Participants done on a seriatim or individual basis. The management of the BFA and IPA may be done in aggregate but each participant would have a separate ownership value in the BFA and the IPA separately. This would allow for participants to match distributions to start on their exact retirement date and match the PADA anniversary dates to the exact timing of their deposits. It would also potentially allow for the voluntary withdrawal of distribution amounts.

The cash flow details of embodiments of the present invention are set forth in the accompanying drawings and the description below. Other features and advantages of the invention will be apparent from the description and drawings.

Figure 2:
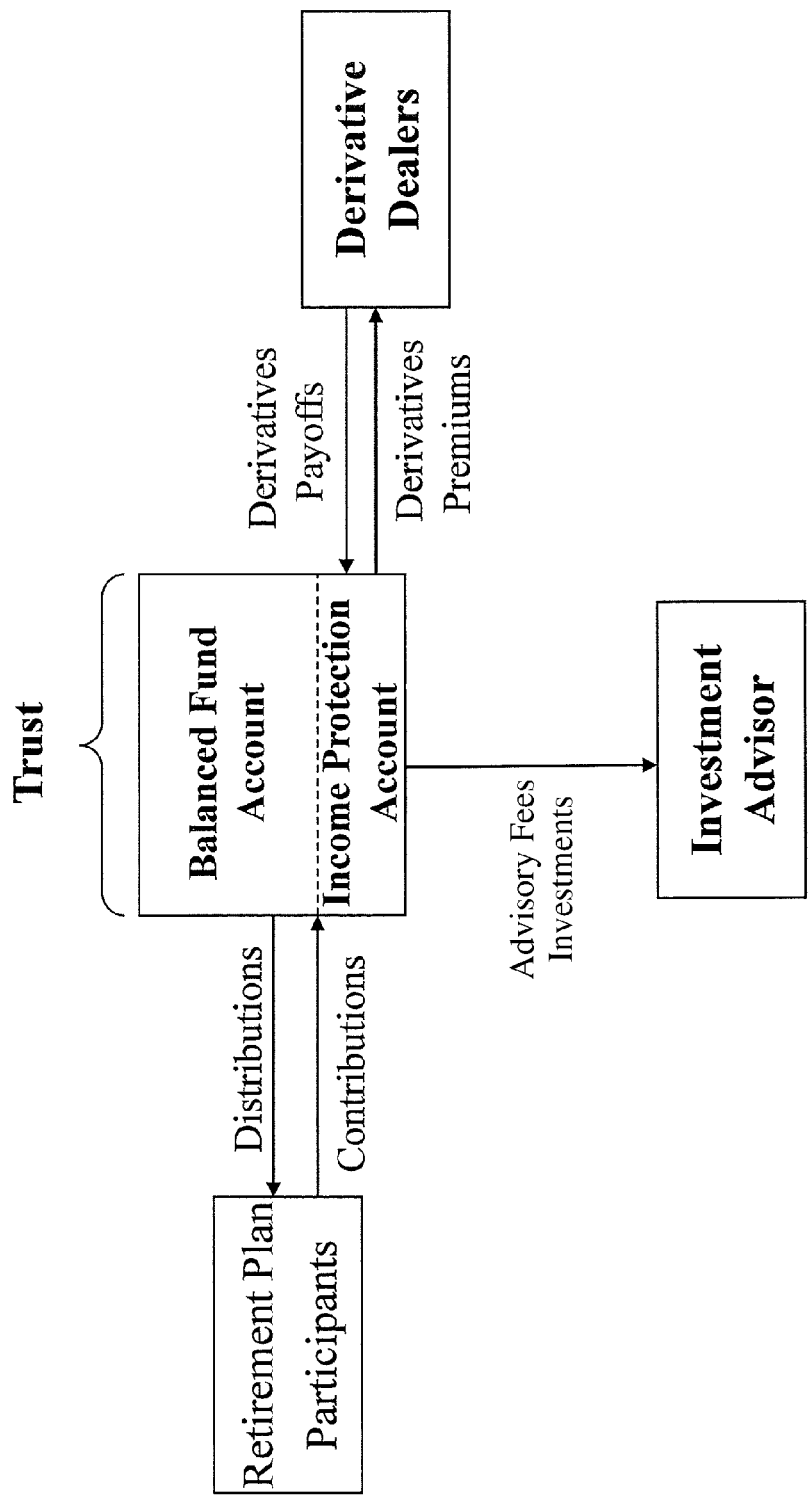
FIG. 2 is a schematic illustrating one embodiment of the present invention providing a retirement income benefit without the use of a third-party guarantor.

FIG. 2 is a schematic that illustrates aspects of one embodiment of the present invention, illustrating the incorporation of an IPA within the Trust. The Income Protection Assets are held within the Trust and owned directly by participants.

In the embodiment of FIG. 2, Retirement Plan Participants contribute to the plan through recurrent Contributions and the funds are deposited into a Trust. The Trust contains two sub-accounts (or trusts): 1) the BFA and 2) the IPA. The BFA provides exposure to equity and fixed income investments. The IPA enters into risk mitigation transactions. Collectively, the BFA and IPA are designed to protect a retirement income amount (e.g., annual distributions) after an accumulation period. The distributions are provided directly through the Participant Accounts, the BFA and the IPA, not through a third party guarantor, as in the prior art depicted in FIG. 1. The Trust itself, through the operation of the IPA, enters into the risk mitigation positions through an Investment Advisor according to explicit management objectives and instructions contained in governing Trust documents. The IPA instruments are rebalanced periodically to align the key risk sensitivities of the assets in the IPA with the IPA Claims including but not limited to delta (changes in fair value with respect to the Balanced Fund Assets), rho (changes in fair value with respect to interest rates), vega (changes in fair value with respect to equity-market volatility). These active adjustments are designed to deliver protection of future retirement income amounts, the PADAs. This is necessary because the risk sensitivities of the IPA Claims (i.e., PADAs paid from the IPA) will change depending on the evolving BFA market values, interest rates and other market dependent variables, as well as the remaining years of the accumulation period. Instead of relying on a third-party guarantor, like an insurer managing a derivatives portfolio on its own balance sheet, the Investment Advisor manages the derivatives portfolio directly for the Trust. The Investment Advisor diversifies credit exposure by entering into transactions with a number of Derivative Dealers and by utilizing listed exchange traded contracts on behalf of the Trust. The Investment Advisor earns an asset management advisory fee for managing the Trust. The combination of the IPA (holding the risk mitigation instruments) and the BFA provides for Distributions, the lifetime PADAs to be paid to the Participant(s). Distributions are made to each surviving Participant after a designated accumulation period and are paid for by a combination of initial Contributions to the BFA, investment returns on the BFA and assets held in the IPA. The IPA makes whole the PADAs to the extent the BFA becomes depleted by PADA distributions. Beneficiaries receive as a death benefit any assets remaining in the BFA at the time of death.

In another embodiment of the invention, the IPA is an auxiliary account held in a separate fund or Trust (not necessarily the same Trust as the BFA) that references a balanced fund or index. The balance fund or index fund could be managed by a separate investment advisor.

In another embodiment, the BFA could be a target-date or life-cycle fund (i.e., asset allocations that change over time, typically higher fixed income allocations as participants age) or any combination of asset classes or investment strategies. One embodiment might utilize only index mutual funds or ETFs.

In another embodiment, a plan sponsor or other third party entity could provide an external guarantee for the PADA payments. In this manner, the guarantee represents additional insurance that the self-funding risk control techniques of the Trust deliver their initially established objective for the PADA. The external party would ideally not need to manage any assets to directly protect for its obligation as the Trust itself employs the self-funding techniques.

In other embodiments, the IPA may limit risk mitigation instruments utilized or utilize ones beyond those discussed herein, as may be known in the art.

In another embodiment, the PADA is paid until the death of the participant or the participant's spouse.

In another embodiment, the Trust may pool individuals together that were previously unrelated or unknown to each other prior to the establishment of the Trust, together creating a retirement group plan.

In another embodiment, the Trust may invest 100% of the Participant deposits into Balanced Fund Assets and borrow amounts to be utilized as Income Protection Assets. The borrowed amounts could be paid back over time from the Balanced Fund Assets charged as an ongoing fee.

In another embodiment, the PADA is paid for a fixed period of time such as 20 years. The period of time could be set to approximate life expectancy of the Participant. In this embodiment, the Participants would not necessarily be required to forfeit IPA amounts upon death. In the event of death of the Participant prior to the end of the fixed period, the Participant's beneficiary may receive the full value of the Trust (BFA and IPA amounts) or may elect to continue to hold the Trust and receive continued PADA payments through the end of the fixed period.

Another embodiment of the invention utilizes a managed account platform where individuals maintain ownership rights in a separately managed account, rather than shares of a Trust. Participants could invest qualified tax-deferred money, such as Rollover IRAs, or non-qualified money. The managed account platform would facilitate trading, custody, valuation, reporting, liquidity and transparency. The Investment Advisor would perform portfolio trading and risk management of the client accounts. The trading activity dictated by the management of the BFA and IPA may entail 1) calculations performed on an individual basis, 2) trades aggregated and executed at a master account level and 3) trades allocated to the Participant's separate managed accounts according to the individualized calculations. If done in this manner, Participants could receive the benefits of reduced commissions due to the aggregation and scaled execution process.

In another embodiment, the Income Protection Assets and Balanced Fund Assets consist solely of equity, fixed income and money-market securities or equivalents and are actively adjusted to achieve the Trust investment objective. Active rebalancing adjustments are made to assets to align the resulting directionalities and magnitudes of the key risk sensitivities, delta, of the IPA with those of the IPA Claims. This type of program is known in the industry as a "delta only" approach. Such adjustments may include, for example, holding less equity and fixed income instruments or being short equity and fixed income investments in an effort to protect for the PADA on a dynamic rebalancing basis. Note that in this embodiment Income Protection Assets may not include index options or other "derivative" risk mitigation instruments. As a result, the targeted PADA would potentially be subject to more frequent and/or larger adjustments.

In another embodiment, when the IPA as a percent of the total Trust values become significantly different from its initial allocation, it could be reset to the starting allocation with the target PADA adjusted accordingly to reflect the rebalanced mix between BFA and the IPA. Similarly, in another embodiment any gains or losses with respect to managing the IPA against the IPA Claim fair value could be supported by rebalancing the mix between the BFA and the IPA instead of solely adjusting the target PADA to reflect for the gain or loss.

Figure 3:
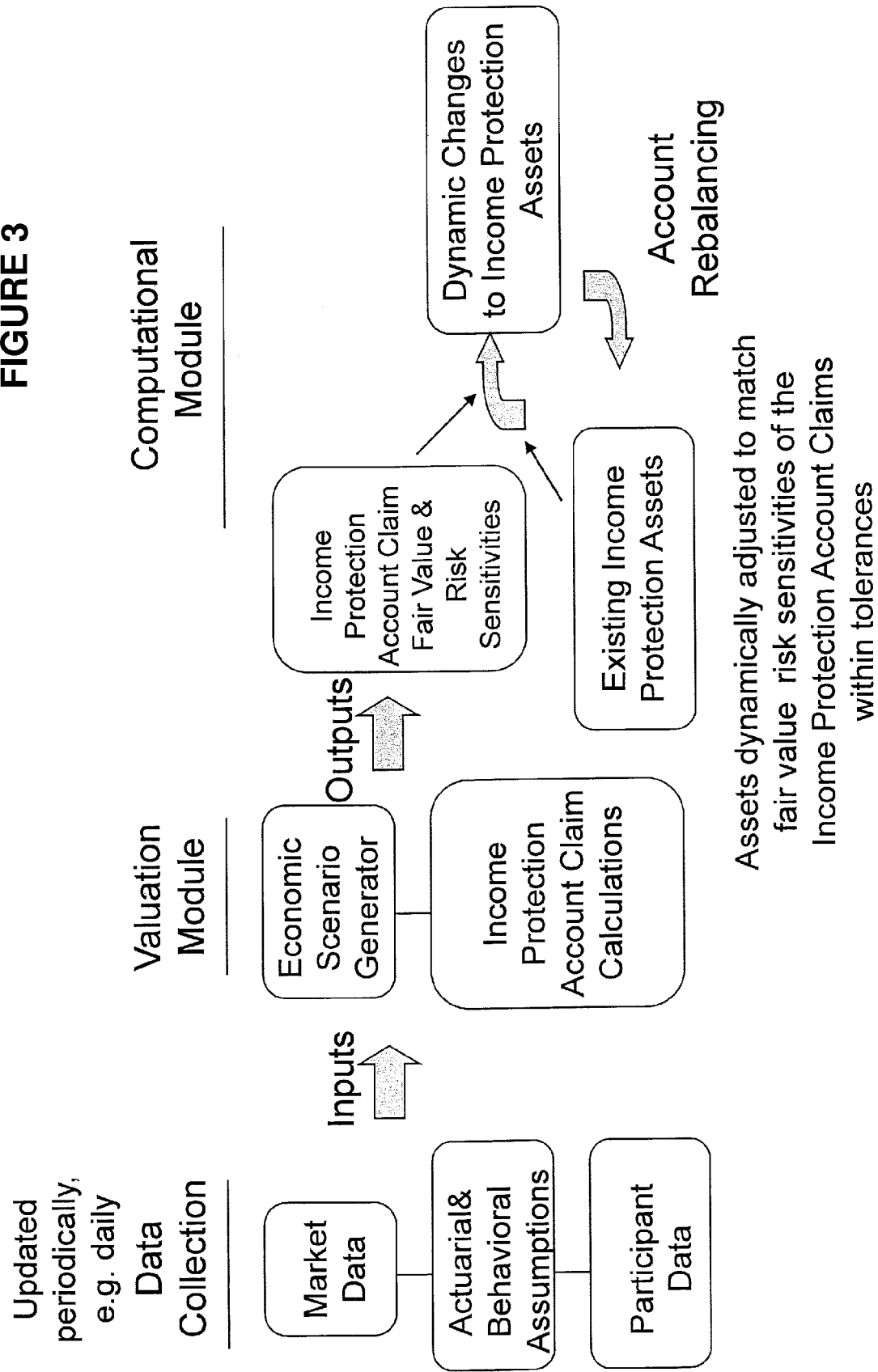
FIG. 3 is a schematic illustrating the computerized operating environment for one embodiment of the present invention that would facilitate the rebalancing of trust assets to sufficiently self-fund for the lifetime retirement income benefits.

FIG. 3 illustrates various computer software modules and inputs to such modules (e.g., workflow) that would be used by the Investment Advisor to determine dynamic rebalancing of the instruments held in the IPA. As will be understood by those skilled in the art, such modules may be stored in local or remote computer readable medium (e.g., ROM, RAM, optical disk, network storage, etc.) which is in communication with one or more computer processors (such as of one or more personal computers or servers) operated by the Investment Advisor, which operate in accordance with the modules to access an electronic database or tables in local or remote electronic memory (e.g., ROM, network storage, RAID arrays, etc.) and perform the functions described throughout. Illustrative modules and their components include:

- a data collection module, including an actuarial component,
- a valuation module, including an economic scenario generator for calculating fair values and fair value risk sensitivities (i.e., hedge ratios), and
- a computational module for determining the dynamic adjustments to the Income Protection Assets.

Although other module configurations may be used, those skilled in the art will appreciate that the foregoing illustrative modules and components provide an effective and efficient means of providing the functionality and achieving the benefits described herein.

A data collection module comprising a market data collection component, a participant data collection component and an actuarial data component may be used. The participant data collection component compiles data from upstream administrative computer systems (e.g., via a network or other communication link) regarding each Participant Account's holdings and demographic data, which permit the valuation module to calculate the necessary values including, but not limited to, fair values and hedge ratios that may be required. The market data collection module compiles current relevant market variables, including security values, interest rates and implied volatilities that are used in generating the economic scenarios used in calculating the fair value and hedge ratios for the IPA Claims for a given point in time.

The actuarial component of the data collection module includes assumptions about Participant behavior relating to mortality rates, Trust elections (e.g., withdrawal rates and deposit rates) and Trust attributes (e.g., expenses, fees and charges). These assumptions are used in the valuation module to calculate the IPA Claims for each scenario of a Monte Carlo simulation. In addition to data elements related to the actuarial component, predictive assumptions about future participant behavior may be used in the valuation module. The behavioral assumptions may consist of business rules such as "if, then" procedures or more complex formulas implemented by the computer processors. Table 1, below, includes illustrative data elements related to Participant data used in accordance with various aspects of the embodiments, which may be stored in a database in electronic memory for use by the processors.

TABLE 1

| Item | Description |
| --- | --- |
| Total Trust Value Amount | The total market value of the Trust |
| Trust Fee Amounts | The expenses, charges and fees related to running the Trust including the fees associated with the Balanced Fund Account and the Income Protection Account |
| Balanced Fund Account Value | The market value of the Balanced Fund Account |
| Income Protection Account Value | The market value of the Income Protection Account |
| Balanced Fund Account Highest Anniversary Value | The value of the Balanced Fund Account on the highest anniversary date since Trust Inception |
| Current PADA | The retirement income amount to be paid as a distribution after the accumulation period |
| Length of Accumulation Period | The remaining time to distributions of the PADA |
| Age of Participant | The age last birthday |
| Participant Gender | A male or female indicator |

The economic scenario generator enables determination of risk positions by generating multiple scenarios of possible future events (e.g., Monte Carlo simulations). Those skilled in the art will realize that very many scenarios may be necessary to achieve desired and appropriate levels of confidence in results. For example, in certain embodiments the number of scenarios that may be used may range from 10,000 to 100,000 depending on the requirements of the activity and the capacity and performance of the applied computer system. As is known generally, a suitable number of scenarios may be determined by running tests to determine how many scenarios are required to show an acceptable degree of convergence in the results without exceeding an available level of computing resource usage.

The economic scenario generator may use any number and variety of capital market inputs depending on which inputs are deemed necessary or relevant to the modeling utilized, which may include the generation of a set of risk-neutral Monte Carlo scenarios. Capital market inputs, including, but not limited to, interest swap rates, credit spreads, index values, fund prices, currency rates, market index correlations, cash repo rates and volatility of all capital market variables may be utilized. Those skilled in the art will realize that numerous different inputs or indicators may be used depending on the particular modeling being undertaken.

Table 2 identifies illustrative capital market inputs and/or market data that may be used as input to the economic scenario generator. In general, such indicators or market data may include any indicator or market data that permits the calculation of necessary fair values and hedge ratios.

TABLE 2

| | |
| --- | --- |
| Treasury Yields - various maturities | Credit Spread - various ratings |
| USD LIBOR Swap rates - various maturities | Equity index implied volatilities - various maturities and strikes |
| Equity market index values - such as S&P500, NASDAQ, Russell 2000, Nikkei, etc . . . | Bond index implied volatilities - various maturities and strikes |
| Bond market index values | Interest rate swaption prices |
| Inflation rates | Index correlations |
| GDP Growth Rate | FX implied volatilities |
| FX Rates | Any indicator or data based on any one or more of the above items listed |
| Market value of securities held in the BFA | Eurodollar Futures of various maturities |

The valuation module utilizes the scenarios produced by the economic scenario generator (the results of which may be stored in and accessed from memory) in order to calculate fair values and hedge ratios associated with the IPA Claims. The valuation module employs known mathematical modern finance routines, such as projected IPA Claims and calculating net present values. The valuation module would calculate the present value of the IPA Claims for each scenario of the Monte Carlo Simulation. The valuation module may then average and store in memory these present values to determine the fair value of the IPA Claims. The same process would be performed for changes in the capital market variables to determine the IPA Claims sensitivities to the capital market variables (e.g. vega and rho). This is accomplished by changing one of the capital market input variables and recalculating an associated IPA Claims fair value. These sensitivities, commonly called hedge ratios, are inputs to the computational module that embodies the management algorithms that the Investment Advisor uses to determine the active adjustments to be made to the holdings of the risk mitigation instruments in the IPA. While the Monte Carlo simulation approach is a common numerical method, it should be noted that there could be other numerical methods utilized to calculate the IPA Claims fair value and hedge ratios.

The computational module embodies the management algorithms that the Investment Advisor uses to actively adjust (i.e., rebalance) the holdings of the risk mitigation instruments in the IPA in response to the actual IPA Claims hedge ratios as calculated by the valuation module. For example, assuming all other variables constant, a drop in the value of the BFA will result in a lower calculated delta. The IPA would appropriately need to start protecting for a potential PADA shortfall since the BFA value is lower and less likely to fund the target PADA objective. Thus, the rebalancing of the IPA would need to reflect the change in delta and reduce (or short) its exposure to assets similar to the BFA. For example, under a delta only hedging program, the IPA rebalancing would simply contemplate a smaller or even short position in the BFA assets. Active rebalancing adjustments to the IPA on a more detailed basis and including the protection against other sensitivities are made pursuant to explicit management objectives and instructions. This is intended to ensure that Trust assets can fund the PADA according to a desired degree of confidence, reflecting a reasoned trade-off between trading cost and accuracy.

FIG. 4 is a spreadsheet illustrating an example of rebalancing the Trust assets for a one day hypothetical market scenario. For simplicity, the example shows a simple delta-only hedging rebalancing approach. The example is further simplified by using only one security, a balanced fund ETF, held in the BFA. An initial deposit of $100,000 is bifurcated into an $80,000 deposit into the BFA and a $20,000 deposit into the IPA. Using the simplified actuarial and participant data assumptions, the $20,000 fair value of IPA Claims (calculated via the valuation module) is for a PADA equal to $4,400. The PADA will reset each anniversary to 5.5% of the greater of the $80,000 deposit or the highest anniversary value of the BFA. Also, using the simplified assumption set, the valuation module calculates a dollar delta of $13,000. In other words, for every one percent (1%) move up or down in the balanced fund ETF, the IPA Claims fair value would similarly change up or down, respectively, by approximately $130 (=0.01*$13,000) The initial IPA portfolio consists of $13,000 worth of the balanced fund ETF (to hedge the dollar delta of IPA Claims) with the remaining $7,000 allocated to a money market fund. Under the scenario depicted, the balanced fund ETF is assumed to drop by 5% (an extreme movement for illustrative purposes only) over the single-day period. After the market drop, the market value of the IPA is $19,350. The PADA that can be protected by an IPA worth $19,350 is calculated to be $4,395. This value is the unique PADA amount in the valuation module that results in an IPA Claims fair value equal to the IPA market value. The resulting dollar delta from the valuation model using the new adjusted PADA is $10,000. As a result, the balanced fund ETF position in the IPA needs to be rebalanced to align the dollar delta of the IPA Claims with the IPA. Thus, $2,350 is sold of the balanced fund ETF and used to purchase $2,350 of a Money Market Fund, resulting in a balanced fund ETF position in the IPA worth $10,000. This process would be repeated periodically until the ultimate disposition of Trust assets. In this example, the PADA is adjusted downward because the market move was very large (e.g., 5%) compared to the volatility assumption utilized. Other IPA instruments such as options on the balanced fund ETF can be utilized to reduce this risk, typically referred to as volatility or gap risk. Also note, the initial delta is positive because the value of the IPA Claims increases when the BFA goes up in value. This is a result of the highest anniversary value protection feature of the PADA. In scenarios in which the market is down a relatively large amount, the delta would turn negative and short positions in the balanced fund ETF would ultimately be required in the IPA.

The management algorithms of the computational module define specific steps to be undertaken by the Investment Advisor for the acquisition, allocation and disposition of Trust assets that contribute to the attainment of the PADA. These steps depend upon any of a number of factors, including the relevant fair values and hedge ratios of the Accounts, the prevailing capital market conditions, and the particular experience and expertise of the Investment Advisor. Individual algorithm steps may affect or consider any one or more of the following (and/or other) factors:

- the individual holdings of risk mitigation instruments;
- interaction between the Income Protection Assets and Balanced Fund Assets;
- outlook for macroeconomic and capital market performance;
- particular risk attitudes the Investment Advisor may hold;
- impact of trading costs;
- asset rebalancing triggers and frequencies; and
- relevant regulatory compliance.

The management of the Trust can be summarized in the following procedures and steps:

Actuarial assumptions are set. These would not be anticipated to change often unless observed mortality experience, generally recorded over years, is determined to be sufficiently different than the assumed mortality rates used in the IPA calculations, Participant Data is collected. New participants or additional contributions are added to the existing Participant database and partial withdrawals are recorded, Capital market variables and inputs are received. These inputs could be captured from live data feeds, The economic scenario generator would be run to produce the scenario set that would be used in calculating the IPA Claim fair value and hedge ratios, The IPA Claims fair value would be calculated via the valuation module utilizing the scenario set generated by the economic scenario generator, The targeted PADA would be adjusted if the IPA Claim fair value differed significantly from the value of the IPA. It would be adjusted to reset the IPA Claims fair value to be equal to the actual value of the IPA.

The IPA Claims hedge ratios and sensitivities would be calculated to reflect the new PADA, The IPA assets would be rebalanced to reflect the IPA Claims hedge ratios and align the sensitivities. The IPA asset adjustments would be determined by the Investment Advisor within the risk guidelines established, The payment of fees would be assessed and paid to the Investment Advisor and any other third party administrators on a regular basis such as daily, monthly, etc., The BFA would be rebalanced if warranted. The BFA would be rebalanced on a periodic basis, such as quarterly and/or if the asset allocation differed significantly form a desired asset allocation, Actual payments of PADA would be made if warranted. The PADA payments would be made on specific date stipulated in the Trust documents, and This process would be routinely monitored on a regular basis and repeated, for example, in the event of any significant change to any one of the participant data/capital market variables, collection inputs, or changes in actuarial assumptions.

It is to be understood that the present invention is not limited to any single set of factors or management algorithms, such as those described above, and that the creation and implementation of additional related algorithms are contemplated as being within the scope of the present invention. These additional algorithms might respond to observations reached during ongoing management of the Participant Accounts and act to improve or make more efficient future management actions.

Another aspect of embodiments of the invention, a distributed computing environment may be used to manage the processing of tasks (or the aforementioned modules) over a distributed computing infrastructure which may comprise multiple processing units and electronic databases to maximize efficiency and cycle time. The distributed computing management module may utilize "grid" computing in order to speed computations.

The distributed computing environment may include a network of interface units and drives for reading and writing data or files. The term "network" as used herein should be broadly interpreted to include not only computer systems in which remote storage devices are coupled together via one or more communication paths, but also stand-alone devices (e.g., servers or personal computers) that may be coupled, from time to time, to such systems that have storage capability. Consequently, the term "network" includes not only a "physical network" but also a "content network," which is comprised of the data—attributable to a single entity—which resides across all physical networks.

While the invention has been described with respect to specific examples including presently preferred modes of carrying out the invention, those skilled in the art will appreciate that there are numerous variations and permutations of the above described methods and systems (including modules and algorithms) that readily fall within the spirit and scope of the invention.

Those skilled in the art will also recognize that the methods and systems of the present invention have many applications, may be implemented in many manners and, as such, are not limited to the foregoing exemplary embodiments and examples. Moreover, the scope of the present invention covers future variations and modifications that would be understood by a skilled observer to be in keeping with the spirit and intent of the present disclosure and invention.

What is claimed is:

1. A computerized method for providing participants of a trust a protected annual distribution amount (PADA), using a balanced fund account (BFA) and an income protection account (IPA), the IPA including hedges, the BFA and the IPA each having a value at a given time, the method comprising:
   a. receiving capital market variables and inputs;
   b. using a computer processor running software on a computer readable medium to use at least the capital market variables and inputs to calculate an IPA claim fair value and hedge ratios, the IPA claim fair value and hedge ratios based on the PADA;
   c. determining that the IPA claim fair value differs more than a certain amount from the value of the IPA, and adjusting the PADA such that the IPA claims fair value is equal to the value of the IPA;
   d. recalculating the IPA hedge ratios to reflect the adjusted PADA;
   e. rebalancing IPA hedges to reflect the recalculated IPA hedge ratios; and
   f. causing payment of the PADA to be made.

2. The method of claim 1, wherein the PADA is a function of performance of customer-owned funds held in the BFA.

3. The method of claim 1, wherein rebalancing IPA hedges includes dynamic rebalancing between equity and fixed income instruments.

4. The method of claim 1, wherein rebalancing IPA hedges includes reflecting the recalculated IPA claims hedge ratio.

5. The method of claim 1, wherein in which initial payments of the PADA are funded by the BFA and then, if the BFA funds are depleted, the IPA.

6. The method of claim 1, wherein the BFA and IPA are customer-owned funds and the IPA hedges risk associated with providing PADA payments.

7. The method of claim 1, further comprising setting actuarial assumptions, wherein payment of the PADA is based on the actuarial assumptions.

8. The method of claim 1, further comprising repeating steps a through f to reflect a change in any one of participant data, capital market variables or inputs or actuarial assumptions.

9. The method of claim 1, wherein the IPA and the BFA are held in the same customer-owned fund or account.

10. The method of claim 1, wherein the IPA is a separate customer-owned fund or account that hedges for the PADA.

11. The method of claim 1, wherein the PADA is protected by the IPA for a fixed number of years.

12. The method of claim 1, wherein the IPA has an allocation and the allocation can be rebalanced as a percent of other customer-owned funds.

13. The method of claim 1, wherein the BFA is a referenced fund or index and the IPA is a separate customer-owned fund or account that hedges for the PADA.

14. The method of claim 1 further comprising rebalancing the BFA.

\* \* \* \* \*